United States Patent
Van Haaften et al.

(10) Patent No.: US 8,000,455 B1
(45) Date of Patent: Aug. 16, 2011

(54) METHODS AND SYSTEMS FOR CALL PROCESSING

(75) Inventors: Adrian Van Haaften, Greenbrae, CA (US); David Giannini, Santa Barbara, CA (US); Eric Johnson, New York, NY (US); David F. Hofstatter, Santa Barbara, CA (US); David S. Trandal, Santa Barbara, CA (US); Robert Duva, Santa Barbara, CA (US); Robert Smith, Santa Barbara, CA (US); John R. Day, Santa Barbara, CA (US)

(73) Assignee: Callwave, Inc., Santa Barbara, CA (US)

( * ) Notice: Subject to any disclaimer, the term of this patent is extended or adjusted under 35 U.S.C. 154(b) by 1308 days.

(21) Appl. No.: 11/520,439

(22) Filed: Sep. 13, 2006

Related U.S. Application Data

(63) Continuation-in-part of application No. 11/008,779, filed on Dec. 9, 2004, now Pat. No. 7,409,048.

(60) Provisional application No. 60/716,824, filed on Sep. 14, 2005.

(51) Int. Cl.
*H04M 1/64* (2006.01)
*H04M 15/06* (2006.01)

(52) U.S. Cl. ............... 379/88.19; 341/50; 379/114.1; 379/142.1; 379/215.01; 455/415; 705/14.64

(58) Field of Classification Search ............... 379/67.1, 379/90.01, 114.1, 142.02, 207.02, 207.13, 379/218.01, 221.15, 265.09, 88.19, 142.1, 379/215.01; 455/415; 705/14.64; 341/50
See application file for complete search history.

(56) References Cited

U.S. PATENT DOCUMENTS

| | | | |
|---|---|---|---|
| 3,691,301 A * | 9/1972 | Zarouni | 379/114.1 |
| 3,936,613 A | 2/1976 | Nishigori et al. | |
| 3,956,595 A | 5/1976 | Sobanski | |
| 4,009,337 A | 2/1977 | Sakai et al. | |
| 4,022,983 A | 5/1977 | Braun et al. | |
| 4,485,470 A | 11/1984 | Reali | |

(Continued)

FOREIGN PATENT DOCUMENTS

CA 1329852 9/1989

(Continued)

OTHER PUBLICATIONS

Johnson, Dave; Article; "Now You're TALKING—voice—response systems for home offices—Product Information"; http://www.findarticles.com; Feb. 1999.

*Primary Examiner* — Gerald Gauthier

(74) *Attorney, Agent, or Firm* — Knobbe, Martens, Olson & Bear LLP

(57) ABSTRACT

Systems and methods are described for processing calls. A call is received at a softswitch or other call processing system from a caller intended for a first subscriber. The first call is associated with signaling information, the signaling information including a phone number associated with the caller. A determination is made as to whether the first subscriber has previously received a call associated with the caller phone number at the softswitch. If the first subscriber has not previously received a call associated with the caller phone number at the softswitch, a first message is played to the caller. An indication that the first message was played to the caller is stored in association with an account record associated with the first subscriber.

68 Claims, 3 Drawing Sheets

U.S. PATENT DOCUMENTS

| | | | |
|---|---|---|---|
| 4,736,405 A | 4/1988 | Akiyama | |
| 4,809,321 A | 2/1989 | Morganstein et al. | |
| 4,893,336 A | 1/1990 | Wuthnow | |
| 4,994,926 A | 2/1991 | Gordon et al. | |
| 5,040,208 A | 8/1991 | Jolissaint | |
| 5,046,087 A | 9/1991 | Sakai | |
| 5,291,302 A | 3/1994 | Gordon et al. | |
| 5,404,537 A | 4/1995 | Olnowich et al. | |
| 5,434,908 A | 7/1995 | Klein | |
| 5,459,584 A | 10/1995 | Gordon et al. | |
| 5,467,388 A | 11/1995 | Redd, Jr. et al. | |
| 5,526,524 A | 6/1996 | Madduri | |
| 5,533,102 A | 7/1996 | Robinson et al. | |
| 5,533,106 A | 7/1996 | Blumhardt | |
| 5,577,111 A | 11/1996 | Iida et al. | |
| 5,583,918 A | 12/1996 | Nakagawa | |
| 5,619,557 A | 4/1997 | Van Berkum | |
| 5,640,677 A | 6/1997 | Karlsson | |
| 5,651,054 A | 7/1997 | Dunn et al. | |
| 5,668,861 A | 9/1997 | Watts | |
| 5,751,795 A | 5/1998 | Hassler et al. | |
| 5,774,067 A | 6/1998 | Olnowich et al. | |
| 5,805,587 A | 9/1998 | Norris et al. | |
| 5,809,128 A | 9/1998 | McMullin | |
| 5,812,551 A | 9/1998 | Tsukazoe et al. | |
| 5,825,867 A | 10/1998 | Epler et al. | |
| 5,832,060 A | 11/1998 | Corlett et al. | |
| 5,835,573 A | 11/1998 | Dee et al. | |
| 5,894,504 A | 4/1999 | Alfred et al. | |
| 5,946,386 A | 8/1999 | Rogers et al. | |
| 5,960,064 A | 9/1999 | Foladare et al. | |
| 5,960,073 A | 9/1999 | Kikinis et al. | |
| 5,963,629 A | 10/1999 | Jung | |
| 5,995,594 A | 11/1999 | Shaffer et al. | |
| 5,995,603 A | 11/1999 | Anderson | |
| 6,014,436 A | 1/2000 | Florence et al. | |
| 6,032,051 A | 2/2000 | Hall et al. | |
| 6,034,956 A | 3/2000 | Olnowich et al. | |
| 6,035,031 A | 3/2000 | Silverman | |
| 6,044,059 A | 3/2000 | Olnowich | |
| 6,078,581 A | 6/2000 | Shtivelman et al. | |
| 6,104,800 A | 8/2000 | Benson | |
| 6,144,644 A | 11/2000 | Bajzath et al. | |
| 6,160,881 A | 12/2000 | Beyda et al. | |
| 6,167,127 A | 12/2000 | Smith et al. | |
| 6,169,795 B1 | 1/2001 | Dunn et al. | |
| 6,169,796 B1 | 1/2001 | Bauer et al. | |
| 6,175,618 B1 * | 1/2001 | Shah et al. | 379/207.13 |
| 6,175,622 B1 | 1/2001 | Chiniwala et al. | |
| 6,178,183 B1 | 1/2001 | Buskirk, Jr. | |
| 6,181,691 B1 | 1/2001 | Markgraf et al. | |
| 6,208,638 B1 | 3/2001 | Rieley et al. | |
| 6,212,261 B1 | 4/2001 | Meubus et al. | |
| 6,226,373 B1 * | 5/2001 | Zhu et al. | 379/207.02 |
| 6,230,009 B1 | 5/2001 | Holmes et al. | |
| 6,243,378 B1 | 6/2001 | Olnowich | |
| 6,253,249 B1 | 6/2001 | Belzile | |
| 6,278,704 B1 | 8/2001 | Creamer et al. | |
| 6,304,565 B1 | 10/2001 | Ramamurthy | |
| 6,310,939 B1 | 10/2001 | Varney | |
| 6,350,066 B1 | 2/2002 | Bobo, II | |
| 6,353,660 B1 | 3/2002 | Stevens et al. | |
| 6,353,663 B1 | 3/2002 | Stevens et al. | |
| 6,363,414 B1 | 3/2002 | Nicholls et al. | |
| 6,405,035 B1 | 6/2002 | Singh | |
| 6,411,601 B1 | 6/2002 | Shaffer et al. | |
| 6,411,805 B1 | 6/2002 | Becker et al. | |
| 6,438,216 B1 | 8/2002 | Aktas | |
| 6,438,222 B1 | 8/2002 | Burg | |
| 6,477,246 B1 | 11/2002 | Dolan et al. | |
| 6,496,569 B2 | 12/2002 | Pelletier et al. | |
| 6,496,576 B2 | 12/2002 | Tanaka et al. | |
| 6,501,750 B1 | 12/2002 | Shaffer et al. | |
| 6,505,163 B1 | 1/2003 | Zhang et al. | |
| 6,510,162 B1 | 1/2003 | Fijolek et al. | |
| 6,510,417 B1 | 1/2003 | Woods et al. | |
| 6,512,930 B2 | 1/2003 | Sandegren | |
| 6,519,258 B1 | 2/2003 | Tsukazoe et al. | |
| 6,539,084 B1 | 3/2003 | Long | |
| 6,546,087 B2 | 4/2003 | Shaffer et al. | |
| 6,549,612 B2 | 4/2003 | Gifford et al. | |
| 6,553,222 B1 | 4/2003 | Weiss | |
| 6,564,264 B1 | 5/2003 | Creswell et al. | |
| 6,564,321 B2 | 5/2003 | Bobo, II | |
| 6,567,505 B1 | 5/2003 | Omori et al. | |
| 6,574,319 B2 | 6/2003 | Latter et al. | |
| 6,621,892 B1 | 9/2003 | Banister et al. | |
| 6,643,034 B1 | 11/2003 | Gordon et al. | |
| 6,658,100 B1 | 12/2003 | Lund | |
| 6,661,785 B1 | 12/2003 | Zhang et al. | |
| 6,662,232 B1 | 12/2003 | Nicholls et al. | |
| 6,665,395 B1 * | 12/2003 | Busey et al. | 379/265.09 |
| 6,690,785 B1 | 2/2004 | Stelter et al. | |
| 6,751,299 B1 | 6/2004 | Brown et al. | |
| 6,775,370 B2 | 8/2004 | Burg | |
| 6,782,088 B1 | 8/2004 | Gabara | |
| 6,785,021 B1 | 8/2004 | Gordon et al. | |
| 6,792,094 B1 | 9/2004 | Kirkpatrick | |
| 6,857,074 B2 | 2/2005 | Bobo, II | |
| 6,898,275 B2 | 5/2005 | Dolan et al. | |
| 6,968,174 B1 | 11/2005 | Trandal et al. | |
| 6,973,172 B1 * | 12/2005 | Bitove et al. | 379/114.2 |
| 7,003,087 B2 | 2/2006 | Spencer et al. | |
| 7,254,222 B1 * | 8/2007 | Bauer et al. | 379/114.2 |
| 7,277,530 B2 * | 10/2007 | Kato et al. | 379/90.01 |
| 7,283,813 B2 * | 10/2007 | Hamanaga et al. | 455/415 |
| 7,366,683 B2 * | 4/2008 | Altberg et al. | 705/14.64 |
| 7,409,048 B2 * | 8/2008 | Trandal et al. | 379/88.19 |
| 7,433,454 B2 * | 10/2008 | Watanabe | 379/142.1 |
| 7,596,218 B2 * | 9/2009 | Montemer | 379/218.01 |
| 7,688,958 B2 * | 3/2010 | Dolan et al. | 379/142.02 |
| 7,711,103 B2 * | 5/2010 | Culbertson et al. | 379/221.15 |
| 2002/0009184 A1 | 1/2002 | Shnier | |
| 2002/0010616 A1 | 1/2002 | Itzhaki | |
| 2002/0097710 A1 | 7/2002 | Burg | |
| 2003/0039339 A1 | 2/2003 | Luehrig et al. | |
| 2003/0063731 A1 | 4/2003 | Woodring | |
| 2003/0123629 A1 | 7/2003 | Hussain et al. | |
| 2003/0156700 A1 | 8/2003 | Brown et al. | |
| 2004/0028203 A1 | 2/2004 | Wurster et al. | |
| 2004/0190706 A1 | 9/2004 | Fleischer, III et al. | |
| 2004/0258220 A1 | 12/2004 | Levine et al. | |
| 2005/0053216 A1 | 3/2005 | Spencer et al. | |
| 2005/0123118 A1 | 6/2005 | Terry et al. | |
| 2005/0207556 A1 | 9/2005 | Gonzalez et al. | |
| 2005/0264436 A1 * | 12/2005 | Yamamoto et al. | 341/50 |
| 2005/0265322 A1 | 12/2005 | Hester | |
| 2006/0013374 A1 | 1/2006 | Fleischer, III et al. | |
| 2007/0003047 A1 * | 1/2007 | Batni et al. | 379/215.01 |
| 2008/0292082 A1 * | 11/2008 | Toda et al. | 379/207.02 |

FOREIGN PATENT DOCUMENTS

| | | |
|---|---|---|
| EP | 1 120 954 | 8/2001 |
| EP | 1120954 | 8/2001 |
| JP | 10-513632 | 12/1998 |
| JP | 11-506292 | 6/1999 |
| JP | 2001-168989 | 6/2001 |
| WO | WO 97/26749 | 7/1997 |
| WO | WO 00 60840 | 10/2000 |
| WO | WO 01/76210 | 10/2001 |

* cited by examiner

METHODS AND SYSTEMS FOR CALL PROCESSING

CROSS-REFERENCE TO RELATED APPLICATIONS

This application is a continuation-in-part of U.S. patent application Ser. No. 11/008,779, filed Dec. 9, 2004, now U.S. Pat. No. 7,409,048 and this application claims priority from U.S. Patent Application No. 60/716,824, filed Sep. 14, 2005, the contents of which are incorporated herein in their entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is related to telephonic call processing, and in particular, to methods and systems for providing telephone service.

2. Description of the Related Art

The mobile phone usage has become increasingly prevalent throughout the world. In some parts of the world, mobile phones are more common than landline phones. In addition to providing portability, mobile phones are often associated with enhanced call processing services as compared to conventional landline phones. For example, mobile phones can often be used to provide text messaging. In addition, mobile phones often include a camera and can be used to send pictures or movies to other mobile phones. Often, mobile phone service is offered at a flat monthly rate for a local calling area or on a national calling area basis. Often, mobile phone service provides a certain number of call time minutes included in a set monthly fee, while additional call minutes are charged on a per minute basis. Some operators offer mobile phones on a prepaid basis, where a subscriber pays for a certain amount of call time prior to actually using the call time.

SUMMARY OF THE INVENTION

The present invention is related to telephonic call processing, and in particular, to methods and systems for providing telephone service.

In an illustrative example, if a caller associated with one or more specified characteristics (e.g., certain call history characteristics) calls a phone associated with a user (e.g., a user that is a subscriber of a specified call processing service), the user may be allocated a telecommunications service-related benefit.

In an example embodiment, an incoming call intended for a subscriber is received by a call processing system. The incoming call may have been forwarded to the call processing system as a result of a forward-calls-on-busy (BCF), ring-no-answer (RNA), or do-not-disturb (DND) condition. The incoming call may have been received at the call processing system as a result of the caller dialing a phone number associated with the called party, but that when dialed, connects the caller to the call processing system without the need for a forwarding process. Optionally, if Caller-ID or other caller identification information is available, the call processing can record the Caller-ID or other caller identification information.

Upon receiving the incoming call, the call processing system can prompt the caller, via a tone or voice prompt to leave a message. For example, the prompt can be in the form of a system standard greeting or a greeting previously recorded by the called party. The called party may have selected which greeting is to be played to callers. The caller party then records a message on the call processing system which is stored in memory and/or optionally streamed to a phone or computer terminal associated with the called party. The call processing system can determine that the caller has completed leaving the message. For example, the call processing can detect when the called party has ceased speaking for a predetermined amount of time, and/or detect a caller key press that indicates the caller has completed leaving a message. Upon determining that the caller has completed leaving a message, in one embodiment, the call processing system prompts the caller to press a key or provide a voice command if the caller wishes to become, and register as a subscriber to the call answering service and/or other call processing services for themselves.

Optionally, if Caller-ID or other caller identification information was received with the call, the call processing system uses this information to determine if the caller is already a subscriber prior to providing the foregoing prompts. For example, the call processing system can search a subscriber database, file or other data store using the Caller-ID information or a portion thereof as a search key to determine if the caller is already a subscriber. Optionally, if the call processing system determines the caller is already a subscriber, the prompt asking if the caller wants to subscribe, and/or providing instructions regarding becoming a subscriber, are not provided.

Assuming the call processing has provided the prompt, and the caller has provided a corresponding key press and/or voice command, the caller key press or voice command initiates, by way of example, an Interactive Voice Response (IVR) session to collect the appropriate information from and/or for the caller so that customer care personnel or other agent can transcribe the information and fulfill the request for service. Optionally, in response to the caller key press or voice command, the call processing system can instead connect or forward the caller to a service center wherein service center personnel, such as a live agent, can request that the caller provide certain information, such as billing information, contact information, the caller's home phone number, work phone number, wireless/cell phone number, other phone numbers, home email address, work email address, other email addresses, and so on.

In addition, the personnel can provide the caller with a description of the available service offered by the call processing system and associated cost, if any, and record which of the services the caller wants. For example, the services can include call answering services, call screening services, and so on. The foregoing collected information can be entered in the fields of an appropriate electronic form, such as a registration form, displayed on a terminal screen, and stored in a subscriber or other database or data store. Optionally, if the caller's call included signaling information, such as Caller-ID information, that information can be used to automatically pre-populate certain subscriber record fields.

By way of example, in an embodiment, a method of processing a call at a call processing system comprises: receiving at a call processing system a first call from a caller, the first call intended for a user, the first call including associated signaling information; obtaining caller identification information from the signaling information; transmitting notification information to a computer associated with the user; establishing a 2-way talk path between the call processing system and the caller; playing a greeting to the caller; recording a voice message from the caller; determining when the caller has completed recording the voice message; determining if a first parameter related to the caller is met based at least in part on information retrieved from a data store using the caller identification information; based at least in part on the first parameter being met, playing a sales lead generation prompt; receiving an instruction from the caller provided at least partly in response to the sales lead generation prompt; based at least in part on the response: originating a second call to a call center; bridging the first call and the second call; receiving information from the caller at the call center; and establishing an account for the caller using at least a portion of the received information.

By way of further example, in an embodiment, a call processing system, compromising: a first telephony interface configured to receive a call from a caller; a storage device configured to store a greeting; and a call answering system configured to: play the greeting in response to receiving the call; record a voice message from the caller; determine when the caller has completed recording the voice message; after determining that the caller has completed recording the voice message, and play a prompt regarding the caller becoming a subscriber to call services provided by the call processing system.

By way of another example, in an embodiment, a method of processing a call compromises: receiving at a call processing system a first call from a caller, the first call intended for a user; playing a prompt to the caller during the first call, the prompt asking the caller to take a first action if the caller wants to subscribe to at least a first call processing service; at least partly in response to the first action, requesting account information from the caller; recording the requested account information from the caller, wherein at least a portion of the account information is to be used to provide call processing services to the caller; and during the first call, recording a voice message from the caller for the called party.

By way of yet another example, in an embodiment, a method of processing a call comprises: receiving at a call processing system a first call from a caller, the first call intended for a user, the first call including associated signaling information; playing a greeting to the caller asking the caller if the caller wants to record a message for the user; determining if a first parameter related to the caller is met based at least in part on information retrieved from a data store using the caller identification information; based at least in part on the first parameter being met, playing a sales prompt; receiving an instruction from the caller provided at least partly in response to the sales prompt; at least partly in response to receiving the instruction, requesting information from the caller; and recording requested information from the caller.

An example embodiment provides a method of processing calls, the method comprising: receiving over a network at a call processing system a call from a calling party directed to a phone address associated with a called party, wherein signaling information associated with the call includes the calling party's phone address; determining if the called party has previously received a call from the calling party at the call processing system; if the called party has not previously received a call from the calling party at the call processing system, playing an offer message to the calling party, storing an indication that the offer message was played to the calling party in association with an account record associated with the called party, and providing a first amount of call time at no charge to the called party.

Another example embodiment provides a method of processing calls, the method comprising: receiving at a call processing system a first call from a caller intended for a first user, wherein signaling information associated with the first call includes identification information associated with the caller and/or associated with a communication device from which the first call is placed; accessing call history information associated with the first user; based at least on the call history information, determining if a first offer message is to be played to the caller; and if a determination is made that the first offer message is to be played, playing at least a portion of a offer message to the caller, storing in association with an identifier associated with the first user an indication that the first user is to receive a benefit.

Still another example embodiment provides a method of processing calls, the method comprising: receiving at a call processing system a first call from a caller intended for a first user, the first call associated with signaling information, the signaling information including identification information associated with the caller; accessing call history information; based at least on the call history information, determining if a first offer message is to be provided to the caller; and if a determination is made that the first offer message is to be provided, providing at least a portion of a offer message to the caller, storing in association with an identifier associated with the first user an indication that the first user is to receive a benefit.

An example embodiment provides a method of processing calls, the method comprising: receiving over a network at a call processing system a call from a caller directed to a phone address associated with a called party, wherein signaling information associated with the call includes the caller's phone address; determining if the caller has designated the caller as being eligible to receive offers when calling the called party via a contact record; and based at least in part playing an offer message to the caller storing an indication that the offer message was played to the caller.

DETAILED DESCRIPTION OF PREFERRED EMBODIMENTS

Figure 1:
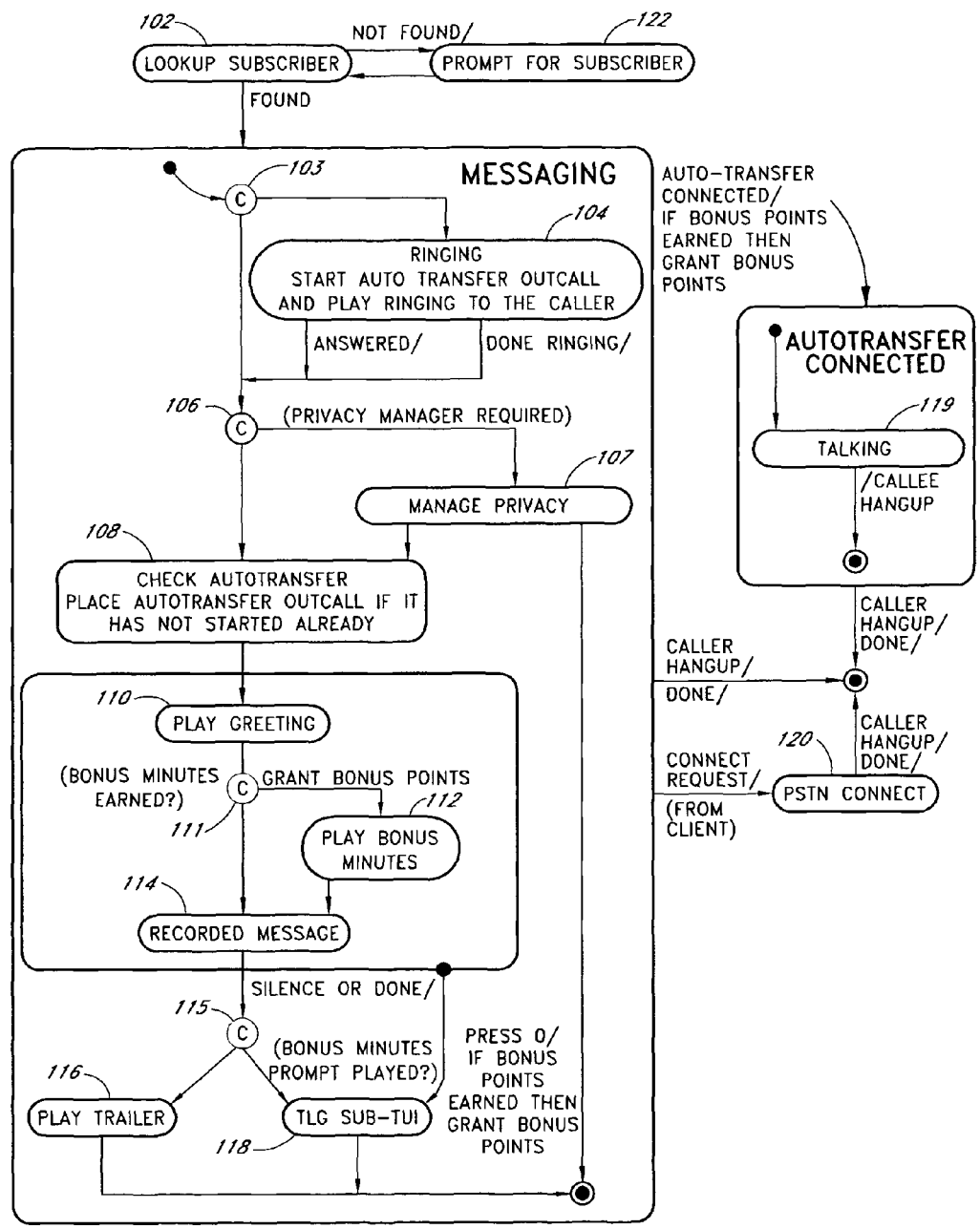
FIG. 1 illustrates a first example process.

The present invention is related to telephonic call processing, and in particular, to methods and systems for providing telephone service.

In an illustrative example, if a caller associated with one or more specified characteristics calls a phone, such as a mobile phone, associated with a user (e.g., a user that is a subscriber of a specified call processing service), the user may be allocated a call services benefit. For example, the user can be awarded additional mobile phone call time without charging the user for such additional call time, the user may receive a discount on call time, and/or the user may receive an account credit. By way of example, the user's mobile phone service may be a prepaid or postpaid mobile phone service.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

In addition, unless otherwise indicated, the functions described herein are preferably performed by executable code and instructions running on one or more general-purpose computers. However, the present invention can also be implemented using special purpose computers, state machines, and/or hardwired electronic circuits.

With respect to the example processes disclosed herein, not all states need to be reached, and the states do not necessarily need to be performed in the same order as that illustrated. Unless otherwise specified, the term phone number refers generally to a telephonic address, such as, without limitation, a standard POTs telephone number, an E.164 phone number (ITU-T recommendation which defines the international public telecommunication numbering plan and telephone format used in the PSTN and certain data networks), or a VoIP address.

Optionally, the VoIP processes described herein are performed using a standardized protocol, such as the H.323 standardized protocol established by the International Telecommunications Union (ITU). Advantageously, H.323 provides specifications for real-time, interactive videoconferencing, data sharing and audio applications such as IP telephony. The Session Initiation Protocol (SIP), established by the Internet Engineering Task Force (IETF), can optionally be used. SIP is generally more efficient than the H.323 protocol as SIP is specifically intended for IP telephony. Non-standard or proprietary protocols, such as those associated with Skype, can also be used.

While certain examples described below may refer to prepaid mobile service, methods and systems described herein can be used for postpaid or still other types of phone services, such as VoIP phone services. In addition, while certain examples refer to bonus points or simply points, other methods or indicators can be used to track benefits ("benefit tracker") earned by a user as a result of new caller calls placed to a user, referrals, etc. While the term "softswitch" is used herein, other call processing systems can be used as well.

In an example embodiment, a user obtains (e.g., buys or licenses) a mobile phone, such as a cell phone, from a provider. By way of example, the provider can be a mobile phone system operator, a mobile virtual network operator (MVNO), or other provider. The service for the mobile phone service may be provided to the user (sometimes referred to as a subscriber) at a monthly service charge, with a limited number of call minutes or no call minutes. The user optionally prepays or post-pays for call time (e.g., call minutes). Optionally, when the phone is initially provided (e.g., by shipping or in a store) to the user, the phone is associated with a certain number of prepaid minutes (e.g., 30, 60, 90, 120 or other number of minutes).

The user may be provided with enhanced call processing services as part of, or separate from the user's phone service subscription. For example, the user may be assigned a phone number (a virtual telephone number/VTN) associated with an enhanced service provider softswitch call processing system. The user may provide this softswitch phone number to others. Calls placed to the softswitch phone number may be routed via the softswitch to the user mobile phone. From a caller perspective, calls to the softswitch phone number service optionally have the standard behavior associated with a mobile phone number (e.g., a call to the VTN is directed to the mobile phone, unless certain conditions occur). However, because calls directed to the VTN route through the softswitch, additional softswitch enabled features for inbound calls are optionally provided, such as some or all of the following services: call screening, call transfer, call conferencing, and distinctive, customizable ringback (using configurable ring back heard by callers when they call), by way of example.

Calls also can be directed to a phone number directly associated with a mobile phone or other phone associated with the user as in the case of a single number service. In this case, calls can optionally transit through a softswitch (e.g., in cooperation with the underlying wireless network operator and with softswitch integration with wireless network system, such as a Home Location Register) with enhanced call processing services, such as those described above. An example embodiment is described in U.S. patent application Ser. No. 11/496,968, titled "Methods and Systems for Providing Telephony Services to Fixed and Mobile Telephonic Devices", which is incorporated herein by reference. In addition, if the called phone number is so configured by the user or a network operator, calls may be optionally forwarded to the softswitch (e.g., on a call forwarding on busy, call forwarding on ring-no-answer, and/or call-forward-all calls (sometimes called do-not-disturb) conditions, as configured by the user).

The softswitch optionally includes a call answering and recording system. In addition, the softswitch can optionally store an electronic address book (e.g., including some or all of the following: name, title, company, phone number(s), instant messaging address, email address, an indication if solicitation messages are or are not to be provided, etc.) and/or a call log in a subscriber account database or elsewhere. For example, a call log optionally includes some or all of the following: a listing of inbound and/or outbound calls (e.g., including caller/called party identifiers (e.g., caller name), caller location, phone address, time of call, length of call, etc.) and recorded messages (e.g., recorded and stored on the softswitch). Optionally, when a new caller calls the user, a new contact record is automatically created and populated using signaling information (e.g., caller ID information) associated with the call.

Other services that are optionally provided to the user via the softswitch or other system include a Follow Me Home service, which enables users to automatically receive calls destined for their mobile phone on a subscriber-designated landline when their mobile phone is either turned off or out of the coverage area. The service enables users to receive calls they otherwise might have missed, and enables them to save money. Users can turn off their cell phone when at home or in the office and still receive their calls, saving mobile minutes in the process.

By way of further example, the call screening and call transfer services help users control which calls they take and where they take incoming calls. For example, call screening enables users to listen to voice messages being left by callers in real-time and, if they choose, interrupt the message to take the call. Call transfer enables users to substantially instantly transfer a phone call received at a first device (e.g., a mobile phone) to a home phone, office phone, mobile phone, or another destination (e.g., by pressing an appropriate keypad key on the subscriber's phone, such as the "2" key). Optionally, the user and/or system operator can configure the user's account so that a caller will be informed that a call transfer is about to take place or has taken place.

With respect to a prepaid phone service, such as a prepaid mobile phone, optionally, when a prepaid mobile phone subscriber runs out of prepaid minutes, the softswitch will still take a voice message and deliver it to the subscriber's email inbox hosted by the softswitch or to a client software application hosted on the subscriber's terminal.

The softswitch optionally includes a sales automation tool that takes leads from incoming calls and attempts to convert certain callers into subscribers. Optionally, when a caller calls the softswitch phone number or a call is otherwise routed through the softswitch, the softswitch plays a solicitation message/prompt to the caller providing information regarding the services provided to subscribers and offering a service subscription to the caller. The softswitch adds points (or otherwise tracks inbound calls that meet certain criteria or benefits allocated as a result of such inbound calls) to the user's account reflecting the call (optionally, if certain criteria are met).

For example, the user may be provided with a first number of points (e.g., 10 bonus points or other number of points) for a new caller (e.g., for a unique caller that had not previously called the subscriber via the softswitch), wherein optionally such points are granted only if the softswitch message regarding call processing services is played to the caller (or optionally, if at least a portion thereof is played to the caller). The user may be provided a second number of points (e.g., 60 bonus points or other number of points) for a caller that begins a subscription process (e.g., interacts with an Interactive Voice Response (IVR) that processes subscription requests and that speaks with a customer service representative regarding becoming a subscriber). The user may be provided with a third number of points (e.g., 40 points or other number of points) for a caller that actually becomes a new subscriber. Other benefit trackers mechanisms can be used as well.

Optionally, the points, or a portion thereof, may have an associated expiration date or trigger. In addition, optionally the points, or a portion thereof, may be cancelled or terminated if certain criteria are met (e.g., user account has a past due balance that has aged a specified period of time).

The points (or other benefit tracking indicators) are optionally stored in a user account record in a user account database maintained by the softswitch or elsewhere. The user account record may store other information, such as an account number or other identifier, a user name, one or more user phone numbers, an indication as to whether the phone numbers are work, home, mobile, or VoIP address, a user email address, a user instant messaging address, one or more identifier associated with one or more carriers (e.g., cellular carriers) providing communication services to the user, a date on which a mobile or other phone device was provisioned to the user, identification information identifying callers that have called the user (e.g., a caller phone number or other identifier), and/or other information. If the caller becomes a subscriber, the caller may also be allocated with a certain number of points. A service subscriber (e.g., the user or other subscriber) can review the number of accumulated points via a web page hosted by the softswitch or other system. For example, the Web page can be part of a Members Zone (e.g., a Web site/page that provides a subscriber with help and/or an account management user interface).

A softswitch operator can specify different price points for the purchase of prepaid minutes, different number of points for a given unique caller and/or new subscriber, different telephone user interface prompts (e.g., to caller's being solicited to be subscribers), etc.

Optionally, at the time of subscription or at designated events thereafter, subscribers are encouraged or asked (e.g., via a Web page user interface, via a voice prompt played to the subscriber via the subscriber's mobile phone, via an SMS (short message service), MMS (multimedia messaging service) or other text/visual message) to authorize an automatic monthly (or other period) top-up of their pre-paid minutes. The subscriber can provide such authorization by providing an appropriate input (e.g., my clicking on an authorization control displayed via a Web page, by providing a designated key press using the subscriber's mobile phone, by providing a specified voice command). Optionally, the more call time minutes purchased by a subscriber, the lower the cost per minute. The following table illustrates example prepaid top-up amounts, although higher, lower, or different amounts can optionally be designated:

| Price | Number of Minutes | Price Per Minute |
| --- | --- | --- |
| $10 | 50 | $0.200 |
| $20 | 110 | $0.182 |
| $30 | 170 | $0.176 |
| $40 | 230 | $0.174 |
| $50 | 300 | $0.167 |
| $100 | 667 | $0.150 |

Subscribers that have opted into top-up of their prepaid minutes are automatically queued for their requested top-up amount once a month (or other designated period) on their monthly billing day (or other designated day) if they meet certain criteria. The criteria can include some or all of the following:

the subscriber's service has not been terminated;

the subscriber's account is not past due (e.g., the subscriber is not being dunned, the subscriber's service has not been suspended, etc.);

the subscriber's phone order is not in a "New" or "In-Process" state (e.g., the subscriber's phone has been ordered but has not yet been delivered and/or activated);

a top-up or call recharge is not in the "New" or "In-Process" state;

In an example embodiment, fulfilling top-up requests is performed automatically by the system and/or by via a human in customer care (e.g., on a daily, weekly, random, or other basis). Top-up requests are optionally presented to one or customer care agents on one or more computer terminals via a web-based tool or otherwise. When the subscriber top-off request is fulfilled, the subscriber is charged (e.g., via a credit card, debit card, Paypal identifier, or other financial instrument on file in the subscriber's account record) the corresponding price for the desired number of minutes. When a recharge/top-off process is completed, a notification (e.g., an email, SMS, MMS, voice mail, and/or other form of notification) is optionally sent by the softswitch or other system to the subscriber confirming the recharge/top-off and optionally informing the subscriber of the total number of prepaid minutes in the subscriber's account.

As previously discussed, the subscriber's account can optionally be configured to provide a custom ring back (the sound heard by a caller prior to the call being answered). For example, the Members Zone (e.g., a Web site/page that provides a subscriber with help and/or an account management user interface) provides a user interface via which subscribers can configure and hear the ring back heard by callers calling the subscriber's phone number. By way of example, the selectable ring back tunes can include a default ring tone and an audibly distinctive ring tone for those subscriber's eligible to receive bonus minutes as described above.

An example embodiment of the call transfer process that could optionally be provided as a service to a subscriber will now be described. A subscriber may choose to transfer their calls to a higher quality network or phone device or to reduce network expense. If the subscriber elects to transfer calls received on the subscriber's mobile phone (e.g., by providing a call transfer command, such as by pressing the 2 key), optionally the subscriber can select which transfer prompt, if any is to be played to the caller. For example, if the subscriber presses the "0" key, or fails to press a key within a specified amount of time after providing the call transfer instruction, no call transfer message is played to the caller. If the subscriber presses the 1, 2, or 3 keys, a call transfer message is played to the caller (e.g., "Callwave (or other service provider name) is transferring this call"). Optionally, the prompt is only played if the caller was connected to the subscriber in full duplex mode. If the caller was being screened by the subscriber (via a half duplex connection), optionally the call transfer message is not played to the subscriber. Instead, optionally an indicator prompt (e.g., a tone such as a "beep beep" tone) is played to the caller when the call transfer has been completed and the caller is connected to the transfer destination in full duplex mode.

As previously discussed, a subscriber may receive bonus points for inbound calls (e.g., for the first phone call received from a given phone number when a service offering message is played to the caller) and/or for a caller and/or other referral that subscribes to a service offering. By way of example, a bonus point (or a designated number of bonus points) can be redeemed for a call minute (or a designated number of minutes) which are added to the subscriber's prepaid call minutes, without or with a charge to the subscriber. Optionally, the bonus points can be applied to reduce the cost of the subscriber's monthly phone service, and/or to obtain enhanced call processing service free of charge or at a discount. Optionally, one or more eligibility requirements need to be met in order to be eligible to receive bonus points. For example, a subscriber may need to have purchased a prepaid cell phone from or via a designated service provider. Optionally, participation in the bonus points program is configurable on a per subscriber basis. Optionally, granted bonus points are not useable until the start of the subscriber's next billing cycle period.

Optionally, bonus points are granted as follows, or using other criteria:
1. New Caller Bonus Points are granted for a call from a new caller/phone if the caller listens to the entire greeting/service offering message (or optionally, a portion thereof). For example, the subscriber may be allocated 0, 5, 10, 15, or other designated number of points. Optionally, bonus points are granted for calls from a caller that is not a new caller, but that has not been played the offering message (e.g., the call is used to determine if a record exists for the calling number, and if so, if an offering message has been played to the caller. If not, the call may cause bonus points to be granted to the subscriber). Optionally, bonus points are granted for calls from a caller that is not a new caller, but that has not been played the offering message within a specified period of time.
2. Referral Bonus Points are granted for a subscription referral. For example, the subscriber may be allocated 0, 30, 60, 90, or other designated number of points. Optionally, the caller who becomes a new subscriber is allocated Referee Bonus Points (e.g., 0, 20, 40, 60 or other designated number of points).

A call to the subscriber qualifies for bonus points if certain criteria are met. For example, the subscriber's account may need to be enabled to receive the bonus points for a new caller, and the call needs to meet some or all of the criteria discussed above, or as similarly discussed below:

A determination as to whether a call qualifies for bonus points may be based, in whole or in part, on the call history, if any, associated with the caller and/or the subscriber. For example, a call may qualify for bonus points if the CallerID (or other identification information) associated with the caller's call (e.g., obtained from signaling information associated with the caller's call) does not match a phone number (or other corresponding identification information) that is already associated with the subscriber account (e.g., if a call (a forwarded, transferred, auto-transferred, voice or fax call) has not previously been received from a caller having the same CallerID or other designated identification information), or, optionally, if the CallerID does match a phone number of a previous caller, but the offering message has not been previously played to the caller. Optionally, a call may cause the award of bonus points if a call had not been previously received from the caller's phone address within a specified period of time (e.g., in the last 6 months, 12 months, 24 months, or other designated period of time), even if a call had been received from the caller/caller phone address previous to the specified period of time.

Optionally, if New Caller Bonus Points have already been issued to the subscriber account based on receiving a call from the current calling number (optionally, in certain cases one or more bonus point prompts will play, but points will not be awarded to the subscriber), then the current call is not qualified to cause bonus points to be granted to the subscriber.

Different stages of the bonus point life cycle for a given subscriber account can be tracked by the softswitch or other system, and reports on the same can be transmitted to the subscriber (e.g., via a Web page, email, SMS, MMS, etc.) and/or to a softswitch system administrator. For example, a tracking report can indicate when points were earned, what was the event that earned the bonus points (e.g., new caller, subscription referral, new subscriber referee, optionally including identification information corresponding to caller, referral, referee), when bonus points were redeemed, when bonus points are no longer redeemable (expired or forfeited). Optionally, a subscriber can be notified (e.g., via one or more of a Web page, email, SMS message, MMS message, etc.) in substantially real time or at a delayed time when points are earned. Optionally, the system sends such a notification to one or more addresses (e.g., an email address, an SMS address, and/or other address). Optionally, the subscriber can specify which addresses are to be used and/or which addresses are not to be used in providing such notification (and can inhibit such real-time notifications to any address), and such subscriber specification is stored in the subscriber's account record. Optionally, notifications regarding new caller bonus points are sent together with or as part of a call notification regarding an incoming call or a voice mail message.

Optionally there may be a limit to the application of bonus points in a given billing cycle (e.g., a monthly billing cycle). For example, a limit of 60 bonus points (corresponding to 60 minutes) can be placed on the number of bonus points that can redeemed during the subscriber's monthly billing cycle period. Optionally, the limit can be expressed as a percentage. For example, the limit may be expressed as a percentage of the previous month (or other period) paid call minutes utilized by the subscriber (e.g., up to 25% of last month's paid call minutes).

Optionally, a subscriber's oldest bonus points are redeemed/applied first. Multiple bonus point grants can be aggregated and be redeemed for minutes (e.g., three grants of 10 points each can be redeemed for 30 points worth of minutes). Optionally, unused bonus points in a given billing cycle may be rolled over and used, and unless they have expired (e.g., an expiration time period may be associated with bonus points, such as 60 days, 90 days, 180 days, 1 year, etc. from the date they have been granted), or have been otherwise cancelled. Thus, subscribers can "bank" bonus points. The following table illustrates the data that can be stored and tracked for a given point grant that has been banked, and has not yet expired or otherwise cancelled. The information can be reported to a subscriber or an operator.

| Attribute | Description |
| --- | --- |
| NumberOfPoints | Number of bonus points |
| CreationDate | Date bonus points granted |
| VestedDate | Earliest date bonus points can first be redeemed |
| ExpirationDate | Earliest date non-redeemed bonus points will expire |

The following table illustrates the data that can be stored and tracked for a given point grant (e.g., a new call point grant of 10 points, a referral point grant of 40 points, etc.) that has been redeemed, expired, or canceled, including the number of points, the date the bonus points status has transitioned (e.g., been redeemed or expired), and the cause of the status transition (e.g., earned, redeemed, unsubscribed, or expired). The information can be reported to a subscriber or an operator.

| Bonus Point History | |
| --- | --- |
| Attribute | Description |
| NumberOfPoints | Number of bonus points |
| ActionDate | Date bonus points were Earned, Redeemed, Unsubscribed or Expired |
| Action | Earned, Redeemed, Unsubscribed or Expired |

Total bonus points redeemed in a monthly billing cycle period is optionally computed by summing the redeemed bonus points in the monthly billing cycle period. For example, if the subscriber's billingDayOfMonth is 10 and the current date is Jun. 27, 2005 then the sum of all redeemed bonus points from Jun. 10, 2005 through Jul. 9, 2005 is the total redeemed bonus points for that period.

Optionally, bonus points are redeemed daily (or other specified time period) for qualifying accounts. An account qualifies if certain specified criteria are met. For example, an account may need to satisfy all of the following criteria in order to qualify (although, optionally, the account may need to satisfy only a subset of the following criteria, additional criteria, or different criteria):

1. Account has one or more "vested" bonus point grants
2. Less than a designated limit of bonus points (e.g., 30, 60, 90 points, or other designated limit) have been redeemed in the current monthly billing cycle period (or other specified time period, such as the past year)
3. Account balance due is <=0 (e.g., the account is not past due).

Optionally, if the number of bonus points redeemed in a current period is less than the limit, and redeeming the oldest vested grant would exceed the limit, then a reduced amount is redeemed and the grant is reduced by the amount redeemed. For example, if the limit is 60 points, and if 40 bonus points have already been redeemed and the account's oldest vested grant is for 60 points, then 20 points are redeemed and 40 of the original 60 remain vested.

As previously discussed, bonus points are optionally initially set to expire a predetermined amount of time (e.g., 90 days) after being granted. However, after each payment in full by the subscriber for service (e.g., for the current balance), the expiration date for the grants for the subscriber's account in question (and optionally for child/aggregated accounts if any (optionally regardless of balance, optionally only if the balance is not past due) is optionally extended (e.g., set to be 90 days from the date of the payment or other specified date). Optionally, bonus points are forfeited (e.g., cancelled) when a subscriber cancels their subscription (e.g., prepaid mobile phone service subscription).

Optionally, when a customer care representative is performing a minute recharge fulfillment, a prepaid top-up tool is displayed on the representative's computer terminal. The tool user interface displays identification information (e.g., subscriber name, account number, etc.) for the subscriber whose account is being recharged. The tool user interface displays bonus points, optionally as recharge minutes (e.g., with the description: $0–40 minutes @ $0.00/minute). The subscriber is not charged when the price is $0. The customer care tool is discussed in greater detail below.

Example greetings played to new callers to a subscriber whose account is eligible to receive bonus points will now be described. When a caller calls such a subscriber, the call is routed to the softswitch. If the softswitch answers, a subscriber greeting is played (e.g., a default greeting or a greeting recorded by the subscriber, such as "This is John Doe, please leave a message after a record indicator is played"). If the call is eligible for awarding bonus points (e.g., if the call is from a phone number from which a call has not been previously received (e.g., as determined from the CallerID signaling data associated with the call) or optionally, if a service offering message has not been previously played to the caller), then after the greeting is played, or when the call is connected (e.g., to the subscriber or a telephone user interface), a prompt, such as one the prompts in the table below, is appended/played. The prompt can be selected based on the subscriber's prompt account setting (e.g., a NewCallerBonusMinutesPrompt setting):

| New Caller Bonus Points Prompts | | |
| --- | --- | --- |
| NewCaller BonusPoints Prompt | Post Greeting Prompt | Connected Call Prompt |
| 0 | <no prompt played> | <no prompt played> |
| 1 | "Cha-Ching (Cash register sound effect) The person you're calling just earned <FirstTimeCallerBonusPoints> bonus minutes because you dialed their number. CallWave, the only company that rewards subscribers for using their cell phone. To learn more, press 0 after leaving your message." BEEP | "Cha-Chin (Cash register sound effect)" |
| 2 | "Cha-Ching (Cash register sound effect) The person you're calling just earned <FirstTimeCallerBonusPoints> bonus minutes because you dialed their number. To learn more, press 0 after leaving your message." BEEP | |
| 3 | "Cha-Ching (Cash register sound effect) The person you called just earned free cell phone minutes because you dialed their CallWave number. To learn more, press 0 after leaving your message." BEEP | |

Optionally, the above prompts are not interruptible while being played (optionally except for a connect, hang-up, or press 0 event). Optionally, pressing '#' during the call greeting on a call that earns bonus points causes one of the above prompts to be played prior to the start of recording a message from the caller. Callers who press '0' (or other designated key) during playing a greeting, or while a message from the caller is being recorded, are dropped into a TLG Sub-TUI (Transfer lead generation sub-telephone user interface, where the caller is transferred to live agent or connected to an IVR which processes subscription requests). Optionally, pressing '#' (or other designated key) during recording causes one of the following to take place:
1. If less than a record duration is less than a specified minimum period of time (e.g., 3 seconds or other specified time period) then the caller is notified that the recording is too short (e.g., via a recording-too-short prompt) is played and the caller is requested to re-record their message.
2. If the record duration is greater than or equal to the specified minimum period of time, then the recording is stopped, the message is delivered to the subscriber, and the caller is taken to the TLG Sub-TUI.

In an example embodiment, an initial greeting optionally provides prompts related to leaving a message for the subscriber and/or to inviting the caller to register for the service the subscriber is using or a similar service. Thus, a registration or subscription solicitation prompt can optionally be played before recording a message from the caller. By way of example, the caller can first record a message for the subscriber and subsequently perform the registration process, or after first performing or completing the registration process, the caller can then be prompted via another greeting to leave a message, and the caller ['s] message for the subscriber can then be recorded. Optionally, during the call session (including during the playing of a greeting or recording of a message), the caller can press an appropriate key, such as the "0" key, and transition to the registration process.

Optionally, the subscriber can specify via the subscriber's electronic address book/contact database which of the subscriber's contacts should not receive a solicitation message. Optionally, the subscriber and/or a system operator can specify days/times as when the solicitation message is enabled to be played, and when the solicitation message is not to be played. Then, when a call is received, the softswitch system or other system can determine whether the caller should or should not be played a solicitation based on one or more of the following:
  whether the caller is already a subscriber;
  whether the caller has previously been played a solicitation message;
  whether the subscriber has specified that a solicitation message is not to be played to the caller;
  whether the playing of the solicitation message has been enabled for the day and/or time the call is received.

An example customer care tool will now be described. The tool enables a customer care agent to subscribe or unsubscribe a user from a top-up subscription (e.g., a subscription that automatically adds prepaid minutes to the subscriber's account and optionally automatically charges the subscriber for such minutes, such as by charging a credit card, conducting a debit card transaction, issuing an invoice, or otherwise. The customer care tool shows the current top-up subscription amount (if any). In addition, as described above, the tool can be used to recharge prepaid minutes. In addition, the tool enables an agent to grant bonus points, redeem bonus points and/or sell minutes at a discount. Optionally, a predefined limit (e.g., 90 points or other amount of points) can prevent a customer care agent from letting a subscriber redeem more than the predefined limit within a given billing cycle period for an account.

FIG. 1 illustrates an example process. The process can be used to automate sales using a sales automation tool (SAT) that takes leads from incoming calls and attempts to convert certain of the callers into subscribers of certain telecommunication services. At state 102, a call directed to a first phone number is received at a softswitch. The softswitch determines if the called party is a subscriber (e.g., by comparing the called phone number with that of subscribers using data stored in a subscriber account database). If the softswitch does not locate a subscriber account corresponding to the first phone number, the process proceeds to state 122. At state 122, the caller is prompted to provide identification information associated with the called party (e.g., the prompt can request the caller to enter, via a phone key pad, or speak the called party's name and/or phone number). Once the identification is received, the process proceeds back to state 102.

If, at state 102, a subscriber account is located, the process proceeds to state 103, and a determination is made as to whether the called party/subscriber has an online telecommunications client application (e.g., via signaling information from the client received over the Internet). If the subscriber has an online telecommunications client application (e.g., hosted on a computer terminal), a Take the Call function is enabled on the client, which, if selected by the subscriber via a Take the Call control, causes the caller to be connected to the subscriber's computer terminal (e.g., via VoIP). At state 104, ringing is played to the caller, and, if enabled, an automatic call transfer process begins.

For example, the softswitch can automatically place an outcall to a telephonic destination associated with subscriber in accordance with rules and destination addresses provided by the subscriber (e.g., automatically transfer calls received at the softswitch to a phone, such as a home phone, work phone, mobile phone, VoIP phone, or other destination), and bridge the inbound caller call and the outcall. If the subscriber elects to take the call (e.g., by answering the call transfer destination, and/or by optionally pressing a specified key or keys), at state 119 the subscriber and caller are connected in full duplex mode. The call terminates when the caller or subscriber hang up. If bonus minutes (optionally in the form of bonus points) were earned then the bonus minutes are granted. If the subscriber answers the outcall call, or the outcall is not answered within a certain number of rings, the process proceeds to state 106.

At state 106, the subscriber's account record is read to determine if the subscriber has privacy manager enabled, and if so, the process proceeds to state 107. The softswitch determines whether the subscriber has specified that caller ID (or other identification information) is requested or required. In this example, the called party has specified that caller ID is requested, and the privacy manager provides a caller ID request prompt. For example, the prompt can request the caller to press a designated single key or multiple keys (such as the '1' key or a '1' key press followed by a '2' key press), or provide a voice response, to unblock their caller ID. By way of illustration, the prompt can recite "The person you are calling has requested to see your caller ID. To send your caller ID, please press one." If the caller unblocks their call ID or otherwise provides designated identification information, the process proceeds to state 108. Otherwise, the caller call is terminated. If privacy manager was not enabled, the process proceeds from state 106 to 108.

At state 108, the softswitch system checks to determine if an autotransfer process has begun (e.g., whether an outcall process has been initiated to transfer the incoming call to a destination associated with the subscriber). If the autotransfer process has not yet been initiated, it now is.

At state 110, a greeting is played by the softswitch or other system to the caller. For example, the greeting can be a greeting recorded by the subscriber or a default greeting provided by the softswitch. The greeting can optionally include the subscriber's name and/or phone number, and can ask the caller to record a message (e.g., "This is John Doe. Please leave a message after the tone.").

At state 111, a determination is made as to whether the call has earned the subscriber bonus minutes, as similarly described above (e.g., if the call is from a new caller with respect to the subscriber). If bonus minutes have not been earned (e.g., the call is from someone who has previously called the subscriber using the phone number associated with the softswitch), the process proceeds to state 114, a beep tone or other record indicator is played to the caller, and the caller leaves a message which is recorded by the softswitch (optionally, the message can be streamed in substantially real time to a communication device associated with the subscriber so that the subscriber can screen the call and/or optionally the recorded message can later be retrieved by the subscriber).

If bonus minutes have been earned, the process proceeds from state 111 to state 112, and a message is played to the caller and/or the subscriber informing them that bonus minutes have just been earned as a result of the call. Optionally, a communication (e.g., an SMS, MMS, email, or voice mail) is transmitted in substantially real time to the subscriber (e.g., to a subscriber telephone or computer) regarding the bonus minutes. The process then proceeds from state 112 to state 114, and a caller message is recorded and stored, as described above. Optionally, the message discussed with respect to state 112 can instead be played after the caller message is recorded.

After the subscriber records a message or if silence is detected (e.g., by determining if the caller has been silent for at least a first predetermined amount of time) the process proceeds to state 115. If the caller presses "0" (or other designated key) during the recording state, the process proceeds directly to the TLG SUB-TUI state 118. At state 115, a determination is made to play the standard trailer end of recording trailer, state 116 (e.g., Thank you for leaving a message, good bye") or to proceed to state 118 if certain criteria have been met (e.g., for a first time caller)

At state 118 a lead generation trailer telephone user interface (TLG sub-TUI) is utilized and described below in detail. Once state 118 is completed, the process ends in this example. Optionally, state 118 can be performed before the caller records a message (e.g., if the caller pressed "0" during the playing of the greeting).

The foregoing process can also be terminated is the caller hangs up during the above process. The subscriber can optionally elect to take the call during the above process via the telecommunications client hosted on a subscriber terminal or via an interface presented via a Web page that is hosted by the softswitch and accessed using a browser on the subscriber terminal, in which case, the process proceeds to state 120, and the caller is connected to the subscriber via the PSTN or otherwise.

Figure 2:
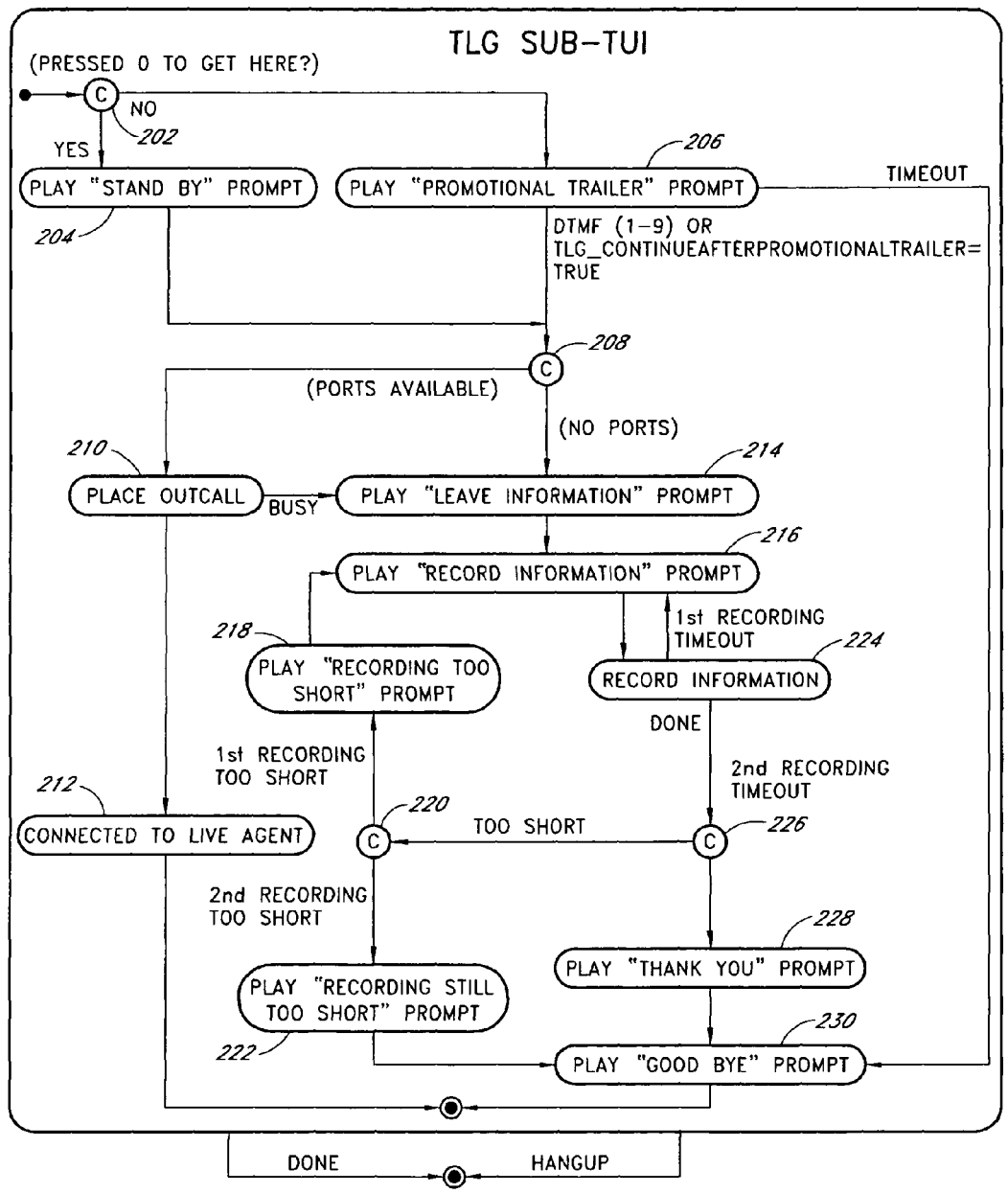
FIG. 2 illustrates a second example process.

Referring now to the example illustrated in FIG. 2, at state 202, a determination is made as to how the caller reached this point in the call process. If the caller pressed "0" or other designated key during the call up to this point, the process proceeds to state 204, and a "standby" prompt is played to the caller (e.g., "Please hold while we connect you to a CallWave (or other service provider name) representative who can tell you more about the CallWave Mobile service"). If the caller otherwise reached this point in the call process (e.g., by finishing recording a message for the caller), a promotional trailer is played to the caller (e.g., "Thanks! CallWave (or other service provider name) has delivered your message. The person you called is a CallWave customer and they earn FREE airtime minutes . . . you can too! Press 1 to learn more.").

At state 208, a determination is made as to whether there are currently any ports available (e.g., any customer representative agents available or any available voice ports to originate an outbound call from the softswitch to a customer service organization). If there is an available port, the process proceeds to state 210, and the softswitch system places an outcall to an agent, and at state 212, the caller is connected to the agent who can then subscribe the caller and sign the caller up for desired call processing or other services. Optionally, the system can insert the caller's phone number into the ANI field of the outcall so that the caller's phone number and/or name can be automatically presented to an agent via a caller identification display, which can be a computer terminal, a dedicated Caller ID display, or other display.

Optionally, the softswitch can insert a unique phone number in the ANI field based on certain criteria including but not limited to information about the caller (e.g., a first time caller indicator, a network caller is calling from (e.g., wireless, wireline, LEC, CLEC), calling geography (e.g., what city, state the caller is calling from), etc., at what point in the call the subscriber expressed an interest in finding out more about services or products offered, and information about the called party (account status, billing status, minutes available, etc.)). Optionally, some or all of the foregoing information can instead or in addition be transmitted from the softswitch over a data network to the call center to be presented to an agent when answering the call.

If, at state 208, a determination is made that a port is not available, the process proceeds to state 214 where a "leave information" prompt is played (e.g., "We're sorry, but all of our customer service agents are currently helping other customers. At the tone, leave us your email address and we will send you more information about this great new service."). At state 216, the system plays a prompt asking the caller to leave a message including contact information so that an agent can later contact the caller and/or so that information may be mailed/emailed to the caller regarding calling services (e.g., "After the tone, please say and spell your email address. Ready? Here's the tone.").

At state 224, the caller records the requested information. At state 226, a determination is made as to whether the message is too short. If the message is to short the process proceeds to state 220. The caller is optionally offered another chance to leave an information message, and if the message is again to short, the process ends.

For example, if the caller does not record a message within a designated period of time, or if the message is shorted than a predetermined duration, the process proceeds to state 218, and the caller is played a "recording too short" prompt ("Your recording is too short, please try again"). If, on a second attempt, the caller's message is still too short, as determined at state 220, the process proceeds to state 222, and a "recording still too short" prompt is played, and the caller is optionally referred to a Web site via which the caller can sign up for call processing services ("We're sorry, your recording was still too short. To learn more about CallWave, you can visit us online at www.GETcallwave.com.").

If, at state 226, a determination is made that the message left by the caller is of sufficient length, the process proceeds to state 228, and a "thank you" prompt is played (e.g., "A confirmation email will be sent to you shortly. Be sure to visit www.getcallwave.com at any time to learn about all the ways CallWave helps you get your important calls. Thanks for your interest in CallWave"). At state 230, a goodbye prompt is played (e.g., "Goodbye"), and the call ends. The call can also be terminated earlier by the caller handing up.

Figure 3:
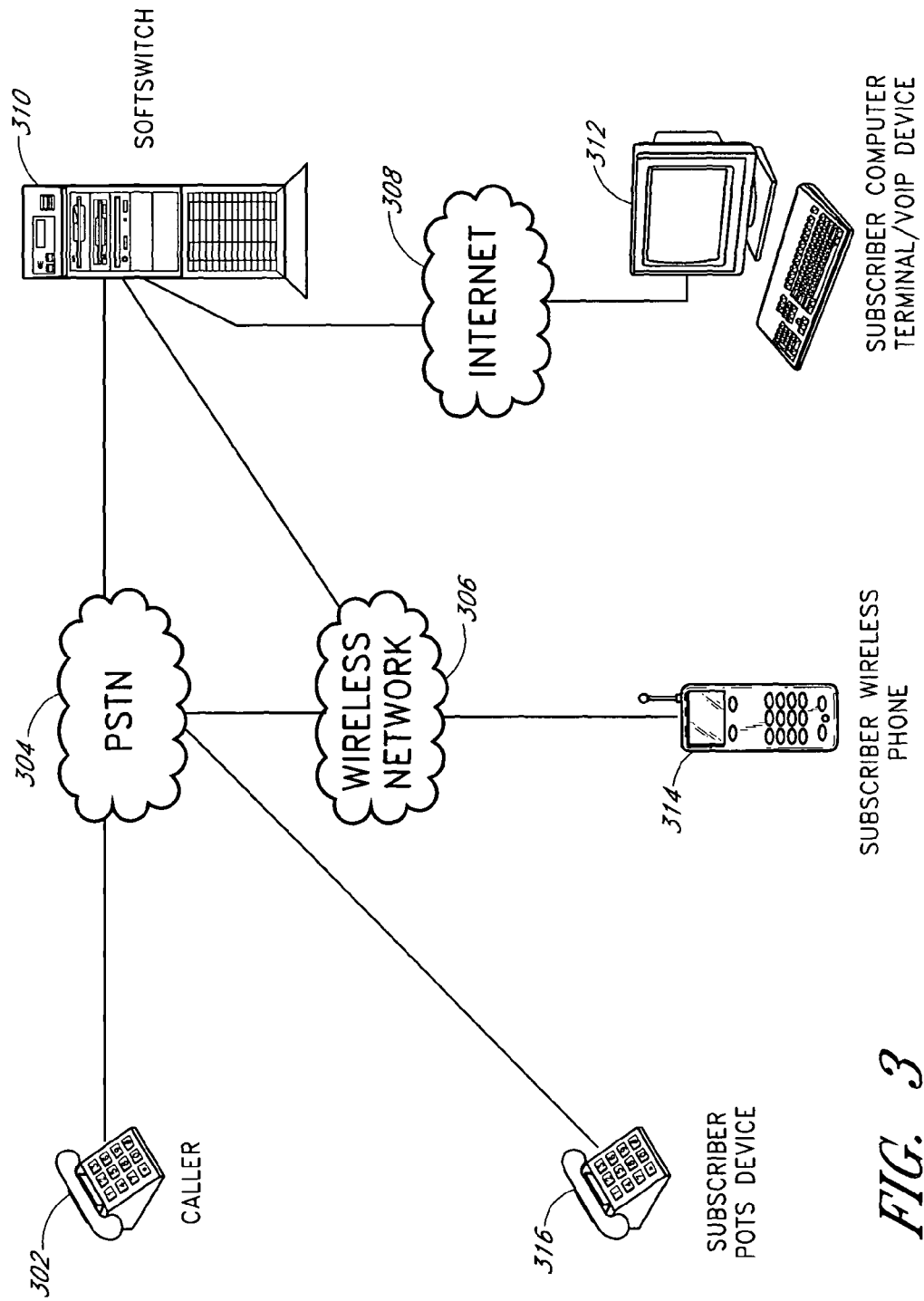
FIG. 3 illustrates an example networked data and communication system.

FIG. 3 illustrates an example communication and computer network which can be used in conjunction with processes described above. A caller can place a call to a subscriber via a phone, such as a POTs phone 302, that is connected to a circuit switched network, such as PSTN 304. However, the caller can use other phone types, including those configured to be connected a packet network and/or a switch circuit network. Thus, by way of example, the caller optionally can call using a mobile, cellular phone, a VoIP phone, or other phone-type. The caller's call can be associated with a softswitch system 310. For example, the caller may dial a phone number assigned to the softswitch or the caller may dial a phone number that has calls forwarded to the softswitch system 310.

The PSTN 304 can communicate with a softswitch system 310 using SS7 signaling, ISDN-PRI signaling, SIP signaling, other Internet or non-Internet protocols, or otherwise. For example, the PSTN can also include or be connected to a SIP proxy (e.g., optionally associated with a VoIP service provider) and can communicate with the softswitch system 310 using SIP and/or SS7 protocols.

The softswitch system 310 may communicate with one or more destinations associated with the subscriber. For example, the softswitch system 310 may communicate over the Internet 308 or other data network with a subscriber computer and/or VoIP device 312 (which can be in the form of a personal computer, interactive television, dedicated VoIP phone, or other terminal). As similarly discussed above, the subscriber computer/VoIP device 312 is optionally equipped with a telecommunications client application that receives and displays call information (e.g., in substantially real-time) regarding calls received for the subscriber at the softswitch system 310. The device 312 is optionally equipped with a microphone, speaker, and VoIP software and can act as a telephonic device (e.g., a VoIP phone).

Optionally, the softswitch system 310 can stream voice messages being left by callers for the subscriber in substantially real time to the telecommunications client hosted on the device 312. In addition, a call alert, including signaling information associated with a given call, can be transmitted in substantially real time to the telecommunications client hosted on the device 312. Some or all of the call alert information can be displayed to the user via the device display. Optionally, the call alert notification includes call transition information for a call in substantially real time. Optionally, a sound (e.g., a beep, waves, music, etc.) can be played by the device 312 in response to, or under the command of the call alert.

Optionally, the subscriber can activate a client control to take the call at the device 312, or the subscriber can activate a control to transfer the call to another destination (e.g., another phone/terminal). Optionally, the user can access a call log of calls (e.g., including caller/called party identifiers (e.g., caller name), caller location, phone address, time of call, length of call, etc.) and recorded messages (e.g., recorded and stored on the softswitch). Thus, the telecommunications client can be used to screen calls, take calls, and review past calls and associated voice messages. The telecommunications client optionally maintains and/or accesses from a remote location the subscriber's contact list, which can be automatically populated from call information. In other embodiments, call management controls, call logs, and messages can be presented via a web user interface or otherwise.

Presence detection can be performed by the softswitch system 310 polling or pinging the device 312 via the telecommunications client application, or by the telecommunications client application transmitting a "Login/I'm alive" message and subsequent periodic "keep alive" messages to the softswitch system 310. Optionally, just prior to the normal termination of an online Internet session, the telecommunications client sends a "Logout" message to the softswitch system 310. Optionally, abnormal Internet session termination conditions are detected by the softswitch system 310 timing out the expected Client "Keep alive" message. Thus, the softswitch system 310 is aware of the offline/online status of the device 312 and telecommunications client.

The softswitch system is optionally coupled via a wireless network 314 to a wireless, mobile phone 314 associated with the subscriber. The softswitch system is optionally coupled via the PSTN 304 to a POTs phone 316 associated with the subscriber. The mobile phone 314 and/or the POTS phone 316 can be used to receive calls dialed directly to the phones, calls forwarded by the softswitch system 310, to screen calls, and/or to receive information regarding bonus points/minutes, as similarly discussed above.

Thus, as described above, embodiments of the present invention provide a flexible, customer acquisition service that can be advantageously be used by service providers to promote services, such as call processing services. Certain embodiments advantageously enable the caller to subscribe to the service while experiencing the service first hand. Further, in the same call session, without having to hang-up and call again, a caller can optionally record a message for a system service subscriber, and become a system service subscriber him or herself. Optionally, the called subscriber obtains a benefit, such as free call time, in response to calls received from new callers and in response to new callers becoming subscribers.

It should be understood that certain variations and modifications of this invention would suggest themselves to one of ordinary skill in the art. In particular, the promotion of other enhanced services should not be excluded. The scope of the present invention is not to be limited by the illustrations or the foregoing description thereof.

What is claimed is:

1. A method of processing calls, the method comprising:
receiving over a network at a call processing system a call from a calling party directed to a phone address associated with a called party, wherein signaling information associated with the call includes the calling party's phone address;
determining if the called party has previously received a call from the calling party at the call processing system;
if the called party has not previously received a call from the calling party at the call processing system,
playing an offer message to the calling party,
storing an indication that the offer message was played to the calling party in association with an account record associated with the called party,
providing a first amount of call time at no charge to the called party;
subscribing the calling party;
storing an indication that the calling party has become a subscriber in association with the account record associated with the called party; and
providing a second amount of call time at no charge to the called party at least partly in response to said indication that the calling party has become a subscriber.

2. The method as defined in claim 1, wherein the calling party is subscribed to a call screening service, wherein messages being left on the call processing system are streamed in substantially real time to a telephone associated with the calling party.

3. The method as defined in claim 1, wherein the calling party is subscribed to a service wherein a determination is made as to whether a mobile device associated with the calling party is available, and if so, connecting at least one call to the mobile device, and if the mobile device is not available, connecting the at least one call to another telephone associated with the calling party.

4. The method as defined in claim 1, the method further comprising transmitting a notification in substantially real time to the called party at least partly related to playing the service offer message to the calling party.

5. The method as defined in claim 1, wherein a right to use the first, second, or first and second, amount of call time at no charge does not vest until a first event occurs.

6. The method as defined in claim 1, wherein a right to use the first, second, or first and second, amount of call time at no charge does not vest until a next billing cycle occurs.

7. The method as defined in claim 1, the method further comprising providing an audible message at least to the calling party, the audible message indicating that the called party has received a benefit related to the first, second, or first and second, amount of call time,
wherein the audible message is provided during the call.

8. The method as defined in claim 1, the method further comprising:
recording a message from the calling party; and
streaming the message to a telephonic device associated with the called party in substantially real time.

9. The method as defined in claim 1, the method further comprising:
placing an outcall from the call processing system to a destination associated with the called party; and
bridging the received call and the outcall.

10. The method as defined in claim 1, wherein the call is placed by the calling party using an Internet protocol phone.

11. The method as defined in claim 1, wherein the received call is placed by the calling party using a phone configured to be used with a circuit switched network.

12. The method as defined in claim 1, the method further comprising canceling the first or second amount of call time if a first date is reached.

13. The method as defined in claim 1, the method further comprising canceling the first or second amount of call time if the called party's account is not active.

14. A method of processing calls, the method comprising:
receiving at a call processing system a first call from a caller intended for a first user, wherein signaling information associated with the first call includes identification information associated with the caller and/or associated with a communication device from which the first call is placed;
accessing call history information associated with the first user;
based at least on the call history information, determining if a first offer message is to be played to the caller; and
if a determination is made that the first offer message is to be played,
playing at least a portion of a offer message to the caller,
storing in association with an identifier associated with the first user an indication that the first user is to receive a benefit;
subscribing the caller;
storing an indication that the caller has become a subscriber; and
storing in association with the identifier associated with the first user an indication that the first user is to receive a second benefit relating to calling services at least partly in response to said indication that the caller has become a subscriber.

15. The method as defined in claim 14, wherein the identification information associated with the caller is a phone address associated with a telephonic device from which the first call is placed.

16. The method as defined in claim 14, wherein the call history includes an indication as to whether the first user previously received a call from the caller via the call processing.

17. The method as defined in claim 14, wherein the call history includes an indication as to whether the first user previously received a call from the caller within a designated period of time.

18. The method as defined in claim 14, wherein determining if the first offer message is to be played to the caller is based in part on an indication that at least one offer message had previously been played to the caller.

19. The method as defined in claim 14, wherein the caller is subscribed to a call screening service, wherein messages being left on the call processing system are streamed in substantially real time to a telephone associated with the caller.

20. The method as defined in claim 14, wherein the caller is subscribed to a service wherein a determination is made as to whether a mobile device associated with the caller is available, and if so, connecting at least one call to the mobile device, and if the mobile device is not available, connecting the at least one call to another telephone associated with the caller.

21. The method as defined in claim 14, the method further comprising transmitting a notification in substantially real time to the first user at least partly related to playing the service offer message to the caller.

22. The method as defined in claim 14, wherein the benefit is related to telecommunication services.

23. The method as defined in claim 14, wherein a right to use the benefit does not vest until a first event occurs.

24. The method as defined in claim 14, wherein a right to use the benefit does not vest until a next billing cycle occurs.

25. The method as defined in claim 14, wherein the benefit is call time at no charge or at a reduced charge.

26. The method as defined in claim 14, wherein the benefit is an account credit.

27. The method as defined in claim 14, wherein the benefit is a discount on call time.

28. The method as defined in claim 14, the method further comprising providing an audible message at least to the caller, the audible message indicating that the first user has received the benefit, wherein the audible message is provided during the first call.

29. The method as defined in claim 14, the method further comprising recording a message from the caller for the first user during the first call prior to playing the first offer message to the caller.

30. The method as defined in claim 14, the method further comprising recording a message from the caller during the first call for the first user after playing the first offer message to the caller.

31. The method as defined in claim 14, the method further comprising:

recording a message from the caller; and streaming the message to a telephonic device associated with the first user in substantially real time.

32. The method as defined in claim 14, the method further comprising:

placing an outcall from the call processing system to a destination associated with the first user; and bridging the first call and the outcall.

33. The method as defined in claim 14, wherein the first call is placed by the caller using an Internet protocol phone.

34. The method as defined in claim 14, wherein the first call is placed by the caller using a phone configured to be used with a switched circuit network.

35. The method as defined in claim 14, the method further comprising associating the benefit with an expiration date.

36. The method as defined in claim 14, the method further comprising canceling the benefit if the first user's account is not active.

37. The method as defined in claim 14, wherein the identification information is a phone address.

38. The method as defined in claim 14, the method further comprising providing a user interface to the first user, the user interface providing a report on benefits granted to the first user as a result of calls directed to the first user and on the expiration dates of said benefits.

39. The method as defined in claim 14, the method further comprising extending an expiration date associated with the benefit at least partly in response to the first user paying an account balance.

40. A method of processing calls, the method comprising:

receiving at a call processing system a first call from a caller intended for a first user, the first call associated with signaling information, the signaling information including identification information associated with the caller;

accessing call history information;

based at least on the call history information, determining if a first offer message is to be provided to the caller;

if a determination is made that the first offer message is to be provided, providing at least a portion of a offer message to the caller, storing in association with an identifier associated with the first user an indication that the first user is to receive a benefit;

subscribing the caller;

storing an indication that the caller has become a subscriber; and storing in association with at least one identifier associated with the first user an indication that the first user is to receive a second benefit relating to calling services at least partly in response to said indication that the caller has become a subscriber.

41. The method as defined in claim 40, wherein the call history includes an indication as to whether the first user previously received a call from the caller via the call processing system.

42. The method as defined in claim 40, wherein the call history includes an indication as to whether the first user previously received a call from the caller within a designated period of time.

43. The method as defined in claim 40, wherein determining if the first offer message is to be played to the caller is based in part on an indication that at least one offer message had previously been played to the caller.

44. The method as defined in claim 40, wherein the caller is subscribed to a call screening service, wherein messages being left on the call processing system are streamed in substantially real time to a telephone associated with the caller.

45. The method as defined in claim 40, wherein the caller is subscribed to a service wherein a determination is made as to whether a mobile device associated with the caller is available, and if so, connecting at least one call to the mobile device, and if the mobile device is not available, connecting the at least one call to another telephone associated with the caller.

46. The method as defined in claim 40, the method further comprising transmitting a notification in substantially real time to the first user at least partly related to playing the service offer message to the caller.

47. The method as defined in claim 40, the method further comprising transmitting a notification in substantially real time to the first user at least partly related to the benefit award.

48. The method as defined in claim 40, the method further comprising connecting the first call to a mobile phone associated with the first user.

49. The method as defined in claim 40, wherein a right to use the benefit does not vest until a first event occurs.

50. The method as defined in claim 40, wherein a right to use the benefit does not vest until a next billing cycle occurs.

51. The method as defined in claim 40, wherein the benefit is related to telecommunications services.

52. The method as defined in claim 40, wherein the benefit is call time at no charge or at a reduced charge.

53. The method as defined in claim 40, wherein the benefit is call time at no charge or at a reduced charge, wherein a limit is placed on the amount of no-charge call time that can be earned in a specified period.

54. The method as defined in claim 40, wherein the benefit is call time at no charge or at a reduced charge, wherein a limit is placed on the amount of no-charge call time that can be used in a specified period.

55. The method as defined in claim 40, wherein the benefit is an account credit.

56. The method as defined in claim 40, the method further comprising providing an audible message at least to the caller, the audible message indicating that the first user has received the benefit,
   wherein the audible message is provided during the first call.

57. The method as defined in claim 40, the method further comprising recording a message from the caller during the first call prior to playing the first offer message to the caller.

58. The method as defined in claim 40, the method further comprising recording a message from the caller during the first call after playing the first offer message to the caller.

59. The method as defined in claim 40, the method further comprising:
   recording a message from the caller; and
   streaming the message to a telephonic device associated with the first user in substantially real time.

60. The method as defined in claim 40, the method further comprising:
   placing an outcall from the call processing system to a destination associated with the first user; and
   bridging the first call and the outcall.

61. The method as defined in claim 40, wherein the first call is placed by the caller using an Internet protocol phone.

62. The method as defined in claim 40, wherein the first call is placed by the caller using a phone configured to be used with a circuit switched network.

63. The method as defined in claim 40, the method further comprising associating the benefit with an expiration date.

64. The method as defined in claim 40, the method further comprising canceling the benefit if the first user's account is not active.

65. The method as defined in claim 40, the method further comprising transmitting an offer to purchase prepaid minutes to a telephone associated with the first user using a text and/or multimedia messaging service.

66. The method as defined in claim 40, wherein the benefit has an associated expiration date.

67. The method as defined in claim 40, the method further comprising providing a user interface to the first user, the user interface providing a report on benefits granted to the first user as a result of calls directed to the first user and on an expiration dates of said benefits.

68. The method as defined in claim 40, the method further comprising providing a user interface to the first user via which the first user can instruct the system to connect the first user to the caller during the playing of the offer message.

\* \* \* \* \*

UNITED STATES PATENT AND TRADEMARK OFFICE
CERTIFICATE OF CORRECTION

| | | |
|---|---|---|
| PATENT NO. | : 8,000,455 B1 | Page 1 of 1 |
| APPLICATION NO. | : 11/520439 | |
| DATED | : August 16, 2011 | |
| INVENTOR(S) | : Adrian Van Haaften et al. | |

It is certified that error appears in the above-identified patent and that said Letters Patent is hereby corrected as shown below:

Title page 2, (Item 56), Col. 1, line 63, Under U.S. Patent Documents, change "Stevens et al." to --Burger et al.--.

Column 16, line 4, After "caller)" insert --.--.

Column 19, lines 55-56, In Claim 7, change "first, second, or first and second, amount" to --first amount--.

Column 20, line 22, In Claim 14, change "caller; and" to --caller;--.

Signed and Sealed this
Twenty-eighth Day of February, 2012

David J. Kappos
*Director of the United States Patent and Trademark Office*